US010616466B2

(12) United States Patent
Tabuchi

(10) Patent No.: US 10,616,466 B2
(45) Date of Patent: Apr. 7, 2020

(54) METHODS AND APPARATUS FOR ACTUATOR CONTROL

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 48 days.

(21) Appl. No.: 15/962,710

(22) Filed: Apr. 25, 2018

(65) Prior Publication Data

US 2019/0335088 A1 Oct. 31, 2019

(51) Int. Cl.
*H04N 5/232* (2006.01)
*G02B 7/09* (2006.01)

(52) U.S. Cl.
CPC ........... *H04N 5/23212* (2013.01); *G02B 7/09* (2013.01)

(58) Field of Classification Search
CPC ...... H04N 5/23212; G02B 7/09; G02B 7/102; G02B 7/28; G03B 13/34; G03B 13/36; H02P 6/26; H02P 6/002; H02P 6/182
See application file for complete search history.

(56) References Cited

U.S. PATENT DOCUMENTS

| 5,202,871 A * | 4/1993 | Yokota ................ G11B 7/08511 369/44.29 |
| 6,667,845 B1 * | 12/2003 | Szita .................... G11B 5/5552 360/78.04 |
| 2012/0019185 A1 | 1/2012 | Guidarelli |
| 2017/0041552 A1 | 2/2017 | Calpe Maravilla et al. |

* cited by examiner

*Primary Examiner* — Yogesh K Aggarwal
(74) *Attorney, Agent, or Firm* — The Noblitt Group, PLLC; Hettie L. Haines

(57) ABSTRACT

Various embodiments of the present technology may comprise methods and apparatus for actuator control. The methods and apparatus may comprise various circuits and/or systems to generate a feedback signal according to an induced voltage and further generate various signal processing functions to selectively adjust a gain of the feedback signal. The apparatus for actuator control may comprise an induced voltage detection circuit and a feedback control circuit that operate together to generate the feedback signal used to control the actuator.

20 Claims, 10 Drawing Sheets

| COUNTER | TARGET REGISTER | TARGET GENERATOR | BANDPASS FILTER | GAIN | SWITCH SW1 | SWITCH SW2 |
|---|---|---|---|---|---|---|
| 0 | UPDATE | START | NORMAL OPERATION | GRADUALLY DECREASE (1/2 TO 1/8) | OFF | ON |
| 1 TO N-1 | — | ↓ | INPUT DATA/CLEAR DATA | | OFF | ON |
| N | — | ↓ | INPUT DATA/CLEAR DATA | CUTOFF | OFF | OFF |
| N+1 | — | END | NORMAL OPERATION | GRADUALLY INCREASE (1/8 TO 1/2) | ON | ON |
| N+2 TO M | — | — | NORMAL OPERATION | | ON | ON |

FIG. 11

METHODS AND APPARATUS FOR ACTUATOR CONTROL

BACKGROUND OF THE TECHNOLOGY

Electronic devices, such as cellular telephones, cameras, and computers, commonly use a lens module in conjunction with an image sensor to capture images. Many imaging systems employ various control and/or autofocus methods and various signal processing techniques to improve image quality by adjusting the position of the lens relative to the image sensor.

Position control and/or autofocus systems generally operate in conjunction with an actuator to move the lens to an optimal or otherwise desired position to increase the image quality. Many electronic devices utilize low-noise linear motion, such as linear actuators, to facilitate autofocus and/or to position the lens. Due to the mechanical properties of the linear actuator, however, the settling time of the actuator may be greater than desired due to the voltage that is induced (induced electromotive force (EMF)) by the actuator.

SUMMARY OF THE INVENTION

Various embodiments of the present technology may comprise methods and apparatus for actuator control. The methods and apparatus may comprise various circuits and/or systems to generate a feedback signal according to an induced voltage, and further generate various signal processing functions to selectively adjust a gain of the feedback signal. The apparatus for actuator control may comprise an induced voltage detection circuit and a feedback control circuit that operate together to generate the feedback signal used to control the actuator.

BRIEF DESCRIPTION OF THE DRAWINGS

A more complete understanding of the present technology may be derived by referring to the detailed description when considered in connection with the following illustrative figures.

FIG. 11 is a control sequence chart for operating the feedback control circuit in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various actuators, sensors, lenses, semiconductor devices, such as transistors and capacitors, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
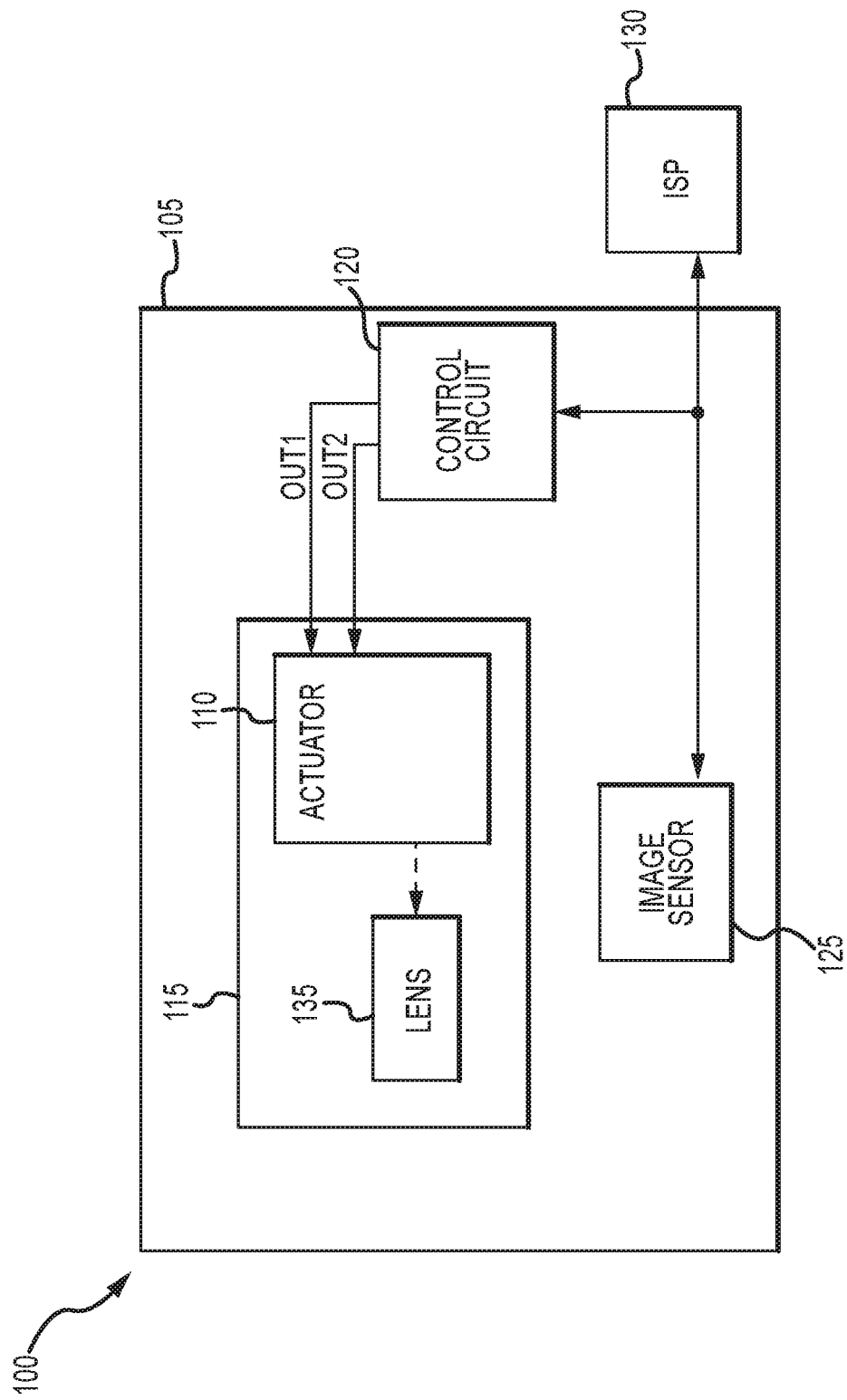
FIG. 1 is a block diagram of an imaging system in accordance with an exemplary embodiment of the present technology.

Methods and apparatus for actuator control according to various aspects of the present technology may operate in conjunction with any suitable electronic system, such as imaging systems, "smart devices," wearables, consumer electronics, and the like. Referring to FIG. 1, an exemplary imaging system 100 may be incorporated into an electronic device, such as a digital camera, smartphone, or portable computing device. For example, in various embodiments, the imaging system 100 may comprise a camera module 105 and an image signal processor (ISP) 130.

The camera module 105 may capture image data and perform various operating functions, such as autofocus and/or optical image stabilization. For example, the camera module 105 may comprise an image sensor 125, a lens module 115 positioned adjacent to the image sensor 125, and a control circuit 120. The control circuit 120 and the lens module 115 may be configured to communicate with each other and operate together to adjust a position of the lens module 115 and/or automatically focus an object or a scene on the image sensor 125.

The image sensor 125 may be suitably configured to capture image data. For example, the image sensor 125 may comprise a pixel array (not shown) to detect light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 125 may be implemented in conjunction with any appropriate technology, such as active pixel sensors in complementary metal-oxide-semiconductors (CMOS) and charge-coupled devices.

The lens module 115 may be configured to focus light on a sensing surface of the image sensor 125. For example, the lens module 115 may comprise a lens 135, with a fixed diameter, positioned adjacent to the sensing surface of the image sensor 125. The lens module 115 may further comprise an actuator 110, for example a linear resonant actuator, such as a voice coil motor (VCM), responsive to the control circuit 120 and configured to move the lens 135 along any one of an x-, y-, and, z-axis.

In various embodiments, the imaging system 100 is configured to move portions of the lens module 115 that secure the lens 135 to reposition the lens 135 and/or to perform autofocus functions. For example, the lens module 115 may comprise a telescoping portion (not shown) that moves relative to a stationary portion (not shown). In various embodiments, the telescoping portion may secure the lens 135. As such, the actuator 110 may move the telescoping portion to shift the lens 135 away from or closer to the image sensor 125 to focus the object or scene on the image sensor 125. In various embodiments, the image sensor 125 may be fixed to the stationary portion or may be arranged at a fixed distance from the stationary portion.

In various embodiments, the ISP 130 may perform various digital signal processing functions, such as color interpolation, color correction, facilitate auto-focus, exposure adjustment, noise reduction, white balance adjustment, compression, and the like, to produce an output image. The ISP 130 may comprise any number of semiconductor devices, such as transistors, capacitors, and the like, for performing calculations, transmitting and receiving image pixel data, and a storage unit, such as random-access memory, non-volatile memory or any other memory device suitable for the particular application, for storing pixel data. In various embodiments, the ISP 130 may be implemented with a programmable logic device, such as a field programmable gate array (FPGA) or any other device with reconfigurable digital circuits. In other embodiments, the ISP 130 may be implemented in hardware using non-programmable devices. The ISP 130 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

According to various embodiments, the ISP 130 is further configured to generate an initial position signal $T_1$ according to pixel data received from the image sensor 125. For example, the ISP 130 may be equipped to determine a degree of focus of the lens module 115 based on the pixel data. The ISP 130 may then determine a position that provides the highest degree of focus. The initial position signal $T_1$ represents the position that provides the highest degree of focus. The ISP 130 may be configured to transmit the initial position signal $T_1$ to the control circuit 120.

The ISP 130 may transmit the output image to an output device, such as a display screen or a memory component, for storing and/or viewing the image data. The output device may receive digital image data, such as video data, image data, frame data, and/or gain information from the ISP 130. In various embodiments, the output device may comprise an external device, such as a computer display, memory card, or some other external unit.

The control circuit 120 controls and supplies power to various devices within the system. For example, the control circuit 120 may control and supply power to the lens module 115 to move the actuator 110 to a desired position. The control circuit 120 may operate in conjunction with the ISP 130, the image sensor 125, and/or other systems to determine the appropriate amount of power and/or current to supply to the actuator 110. The control circuit 120 may generate and supply a current $I_{DR}$, having a magnitude and direction, to the actuator 110, which in turn moves the lens 135. The control circuit 120 may comprise any suitable device and/or system capable of providing energy to the actuator 110.

In general, the actuator 110 responds to the current $I_{DR}$ by moving the lens 135 an amount that is proportion to the current $I_{DR}$ supplied by the control circuit 120. According to an exemplary embodiment, the actuator 110 may comprise a voice coil motor. In operation, the actuator 110 may generate a self-induced voltage (back EMF) that opposes the change that causes it and the faster the rate of change of the current $I_{DR}$, the greater the back EMF. As a result, the actuator 110 may not reach the target position within a desired amount of time.

The control circuit 120 may comprise various circuits and/or systems adapted to produce a feedback signal, generate a final position signal C', and respond by generating the current $I_{DR}$ according to the final position signal C' and supply the current $I_{DR}$ to the actuator 110, which in turn moves the actuator 110 (and lens 135) to a corresponding position. For example, the control circuit 120 may comprise a driver 250, a feedback network, and an adder circuit 265.

According to an exemplary embodiment, the driver 250 (i.e., a drive circuit) drives the actuator 110 and facilitates movement of the lens 135 to the desired position. For example, the driver 250 may receive and respond to a DAC output signal C by generating a drive signal (i.e., the current $I_{DR}$). The driver 250 may facilitate movement of the lens 135 to achieve the desired position, corresponding to the final position signal C', by controlling the current $I_{DR}$ to the actuator 110, which in turn controls the magnitude and direction of movement of the lens 135 (FIG. 1). For example, the driver 250 may apply the drive signal to the actuator 110, wherein the drive signal corresponds to the final position signal C'. The driver 250 may comprise any suitable circuit for varying a voltage across the circuit in order to maintain a desired electrical current output in response to an input signal.

Figure 2:
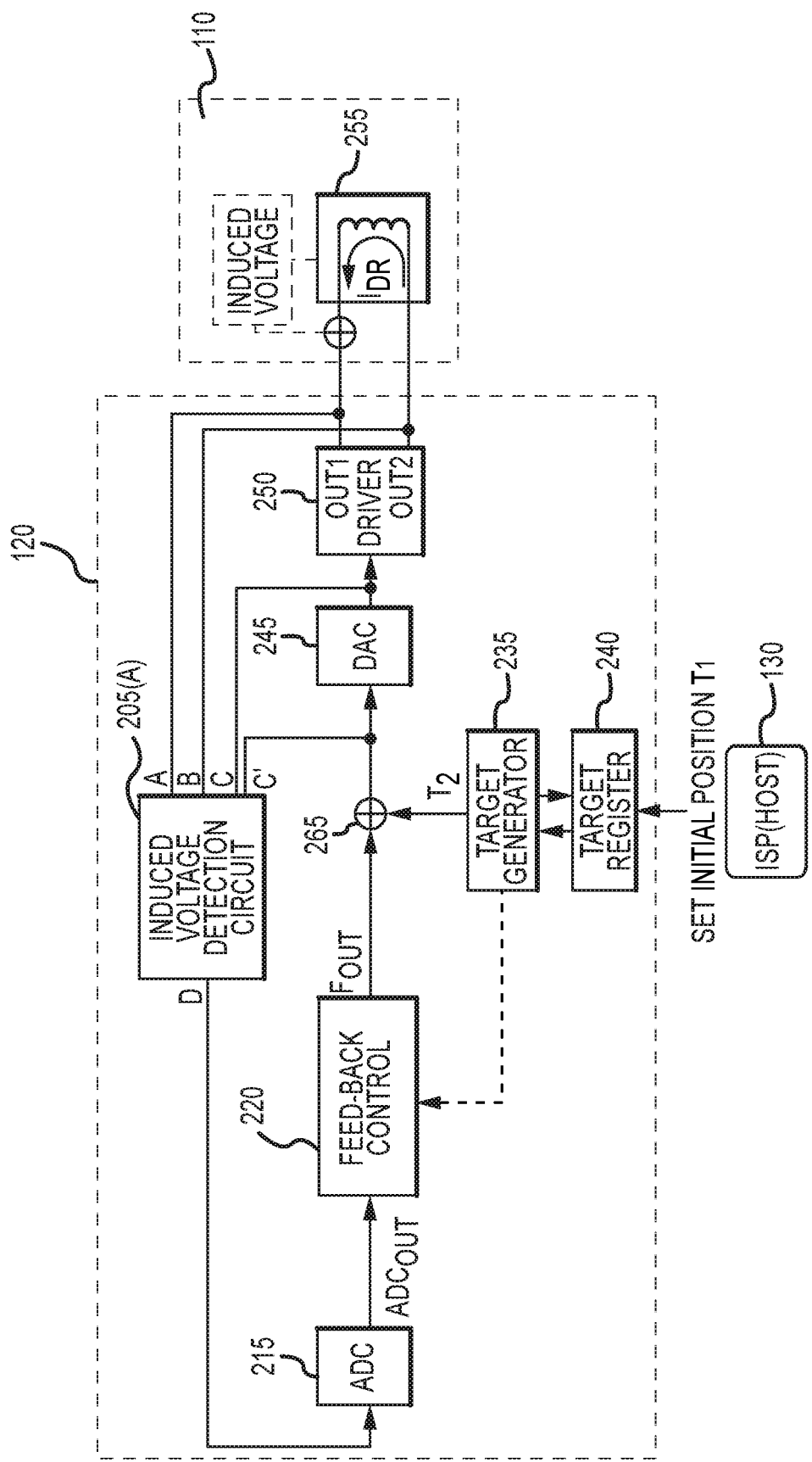
FIG. 2 is a block diagram of an actuator control system in accordance with a first embodiment of the present technology.

In one embodiment, and referring to FIG. 2, the driver 250 may be coupled to the actuator 110 in such a way as to operate the actuator 110 in either a first direction or an opposite second direction. For example, the driver 250 may generate the current $I_{DR}$ through both of a first output terminal OUT1 and a second output terminal OUT2, wherein the current $I_{DR}$ may flow from the first output terminal OUT1 to the second output terminal OUT2 (i.e., a forward direction), or the current IDR may flow from the second output terminal OUT2 to the first output terminal OUT1 (i.e., a reverse direction). The direction of the current $I_{DR}$ may be based on the sign and magnitude of the final target position signal C'.

In operation, the induced voltage appears at either the first output terminal OUT1 or the second output terminal OUT2. For example, and referring to FIG. 2, when the current $I_{DR}$ is flowing from the second output terminal OUT2 to the first output terminal OUT1, then the induced voltage will appear at the first output terminal OUT1. Alternatively, when the current $I_{DR}$ is flowing from the first output terminal OUT1 to the second output terminal OUT2 (not shown), then the induced voltage will appear at the second output terminal OUT2.

Figure 4:
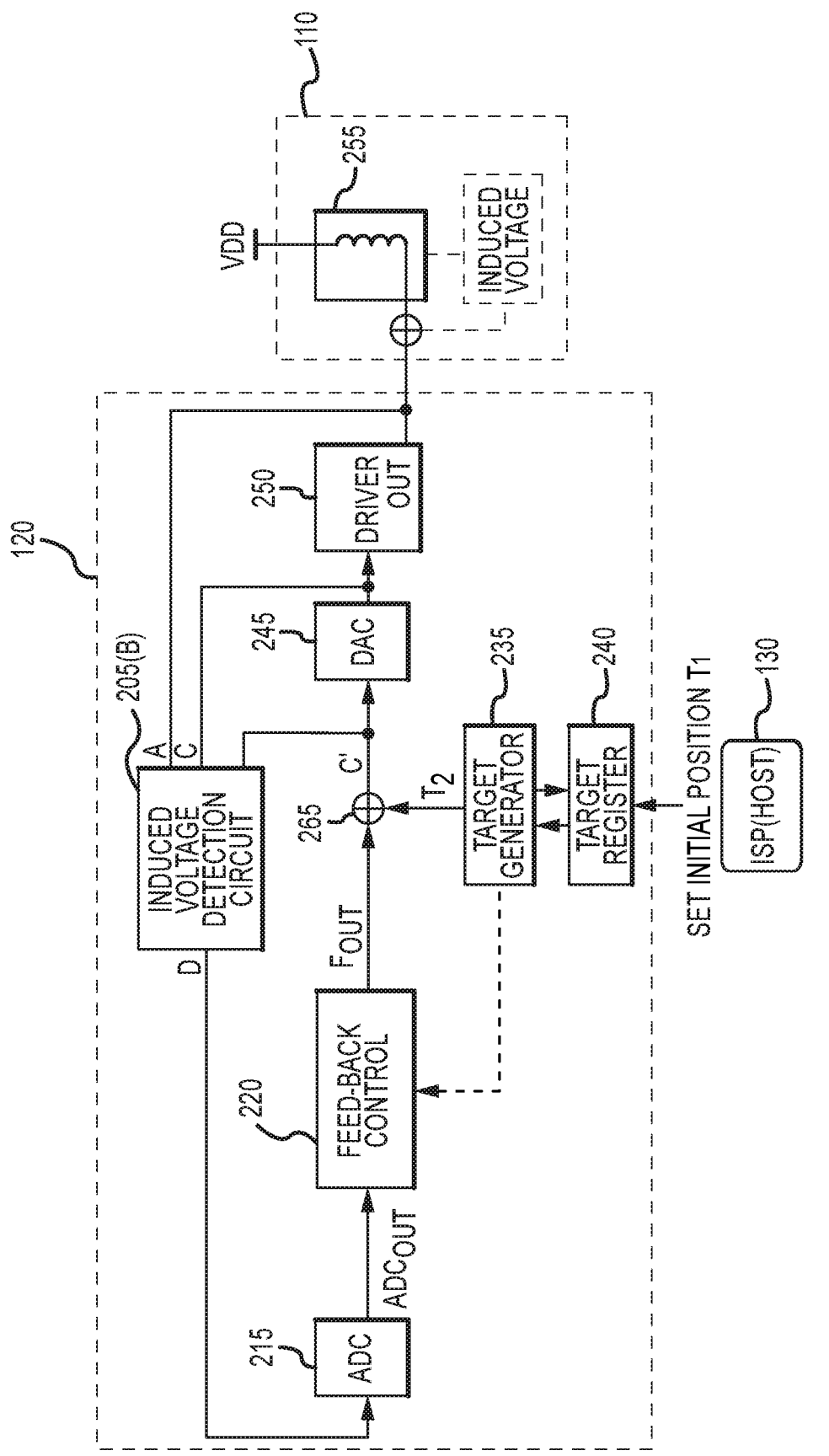
FIG. 4 is a block diagram of an actuator control system in accordance with a second embodiment of the present technology.

In an alternative embodiment, and referring to FIG. 4, the current $I_{DR}$ flows in one direction only. In the present embodiment, the driver 250 may comprise only one output terminal OUT.

The control circuit 120 may further comprise various circuits and/or systems to utilize data from the ISP 130 to generate the final position signal C' corresponding to the desired actuator position. For example, the control circuit 120 may comprise a target register 240 in communication with the ISP 130 and configured to store position information, such as the initial position signal $T_1$. The target register 240 may comprise any suitable memory or storage device capable of storing multiple variables at any given time.

The control circuit 120 may further comprise a target generator configured to generate an updated position signal $T_2$ corresponding to a target position for the lens 135. The target generator 235 may be configured to access data stored in the target register 240 to perform comparisons and/or generate the updated position signal $T_2$. For example, the target generator 235 may be connected to the target register 240. According to various embodiments, the target generator 235 may comprise the signal generator described in U.S. Pat. No. 9,520,823.

Referring to FIGS. 2-6, the control circuit 120 may comprise various feedback circuits and/or network to decrease the length of time it takes the actuator 110 (and the lens 135) to reach a desired position. In general, once the control circuit 120 determines a desired position and applies the current $I_{DR}$ to the actuator 110, the actuator 110 (and the lens 135) oscillates for a period of time before it settles into the desired position. This period of time may be referred to as the settling time. The control circuit 120 may utilize feedback control systems and/or signals to decrease the settling time. For example, the feedback network may comprise an induced voltage detection circuit 205(A/B) and a feedback control circuit 220 that operate together to generate feedback signals.

Referring to FIGS. 2-5, the induced voltage detection circuit 205(A/B) may be configured to detect the induced voltage generated by the actuator 110 and generate an induced voltage signal D. In one embodiment, and referring to FIGS. 2 and 3, the induced voltage detection circuit 205(A) may be connected to both of the first and second output terminals OUT1, OUT2 in a bidirectional actuator system.

Figure 5:
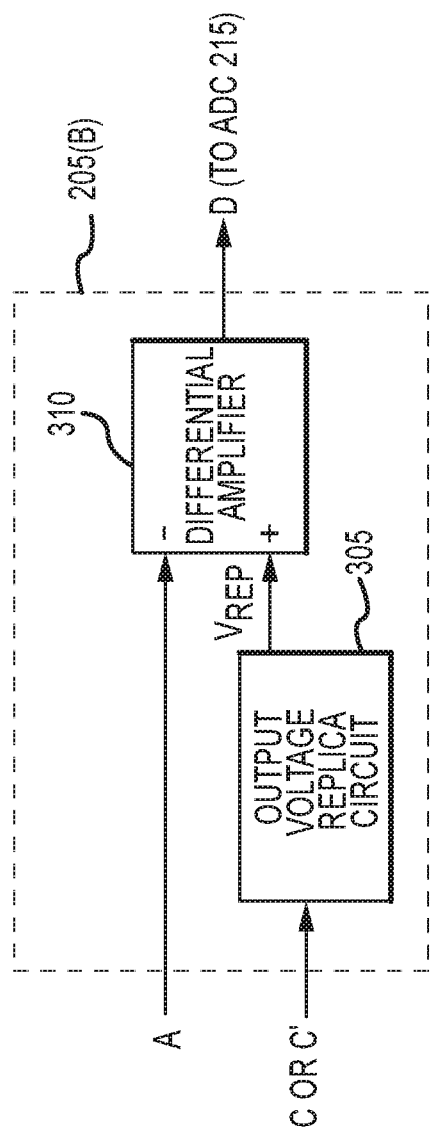
FIG. 5 is a block diagram of an induced voltage detection circuit in accordance with the second embodiment of the present technology.

In a unidirectional actuator system, and referring to FIGS. 4 and 5, the induced voltage detection circuit 205(B) may be coupled to the single output terminal OUT. In various embodiments, the induced voltage detection circuit 205(A/B) may further be communicatively coupled to receive the DAC output signal C and/or an adder output C' (also referred to as the final position signal C'). In various embodiments, the induced voltage detection circuit 205(A/B) may comprise an output voltage replica circuit 305 and a differential amplifier 310.

Figure 3:
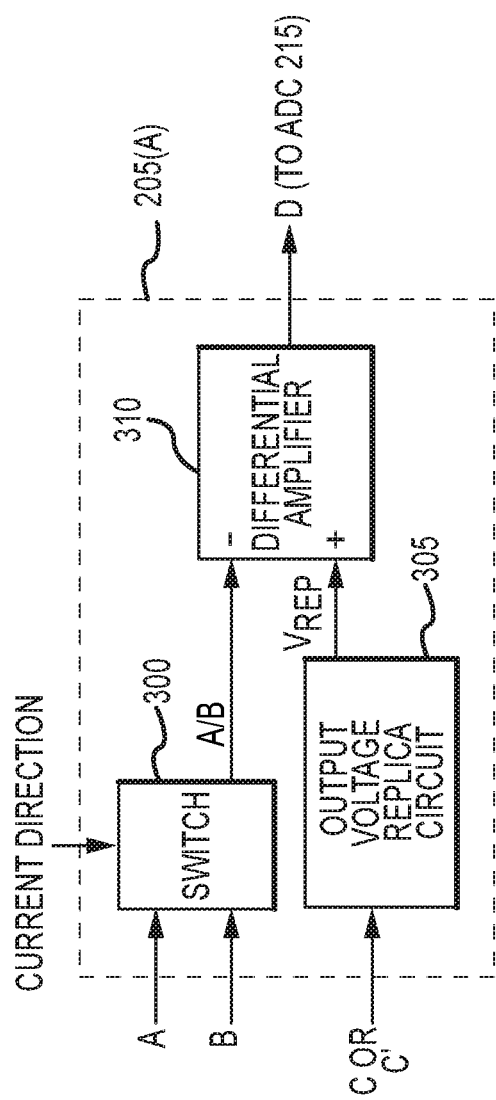
FIG. 3 is a block diagram of an induced voltage detection circuit in accordance with the first embodiment of the present technology.

In one embodiment, and referring to FIG. 3, the induced voltage detection circuit 205(A) may further comprise a switch 300. The switch 300 may be configured to selectively connect one of two inputs to the differential amplifier 310 according to a control signal that represents the direction of the current $I_{DR}$ through the actuator 110.

The switch 300 may be connected to the first and second output terminals OUT1, OUT2, wherein a signal at the first output terminal OUT1 may be referred to as a first signal A and a signal at the second output terminal OUT2 may be referred to as a second signal B. The switch 300 may be configured to selectively couple one of the first signal A or the second signal B to the differential amplifier 310 according to the control signal. For example, and referring to FIG. 3, if the switch 300 receives a control signal with a positive sign (+), then the switch 300 may couple the second output terminal OUT2 (the second signal B) to the differential amplifier 310, and if the switch 300 receives a control signal with a negative sign (−), then the switch 300 may couple the first output terminal OUT1 (the first signal A) to the differential amplifier 310. The switch 300 may comprise any suitable circuit and/or system to select one of various inputs according to the control signal, such as a conventional analog switch, multiplexer, transistor, gated latch circuit, and the like.

In another embodiment, and referring to FIG. 5, the first signal A may be transmitted directly to the differential amplifier 310.

The output voltage replica circuit 305 is configured to receive a signal, such as the DAC output signal C and/or the adder output (e.g., the final position signal C'), and utilize the received signal to generate a voltage $V_{REP}$ (a replica voltage) that replicates the voltage applied to the driver 250.

The output voltage replica circuit 305 is further configured to transmit the replica voltage $V_{REP}$ to the differential amplifier 310. The output voltage replica circuit 305 may comprise any suitable circuit and/or system capable of replicating a voltage according to various input signals. According to an exemplary embodiment, the replica voltage $V_{REP}$ may be described according to the following equation: $V_{REP}=V_{DD}-I_{DR}*R$, where $V_{DD}$ is a supply voltage, $I_{DR}$ is the current through the actuator 110, and R is a resistance of the actuator 110.

The differential amplifier 310 may be configured to amplify a difference between two input signals (e.g., input voltages). In one embodiment, and referring to FIG. 3, the differential amplifier 310 may receive one of the first signal A and the second signal B from the switch 300 at an inverting terminal (−) and the replica voltage $V_{REP}$ at a non-inverting terminal (+). In an alternative embodiment, and referring to FIG. 5, the differential amplifier 310 may receive the first signal A at the inverting terminal (−) and the replica voltage $V_{REP}$ at a non-inverting terminal (+). According to various embodiments, the signal input into the inverting terminal (−) is described according to the following equation: $A/B=V_{DD}-(I_{DR}*R)+/-V_e$, where $V_{DD}$ is the supply voltage, $I_{DR}$ is the current through the actuator 110, R is the resistance of the actuator, and $V_e$ is an induced voltage.

The differential amplifier 310 may output a differential output signal (also referred to as the induced voltage signal D) that represents the induced voltage $V_e$. In various embodiments, the differential amplifier 310 may transmit the induced voltage signal D to a signal converter. In an exemplary embodiment, the induced voltage signal D is described according to the following equation: $D=+/-V_e$ where $V_e$ is the induced voltage.

The control circuit 120 may further comprise at least one signal converter, for example an analog-to-digital converter (ADC) 215. In various embodiments, the ADC 215 may be part of the feedback network. The ADC 215 receives an analog signal and converts the analog signal to a digital signal. The ADC 215 may comprise any suitable system, device, or ADC architecture. In various embodiments, the ADC 215 is connected to an output terminal of the induced voltage detection circuit 205(A/B) configured to receive and convert the induced voltage signal D to a digital signal. The ADC 215 may transmit an output signal $ADC_{OUT}$, representing the induced voltage signal D in a digital form, to the feedback control circuit 220.

Figure 6:
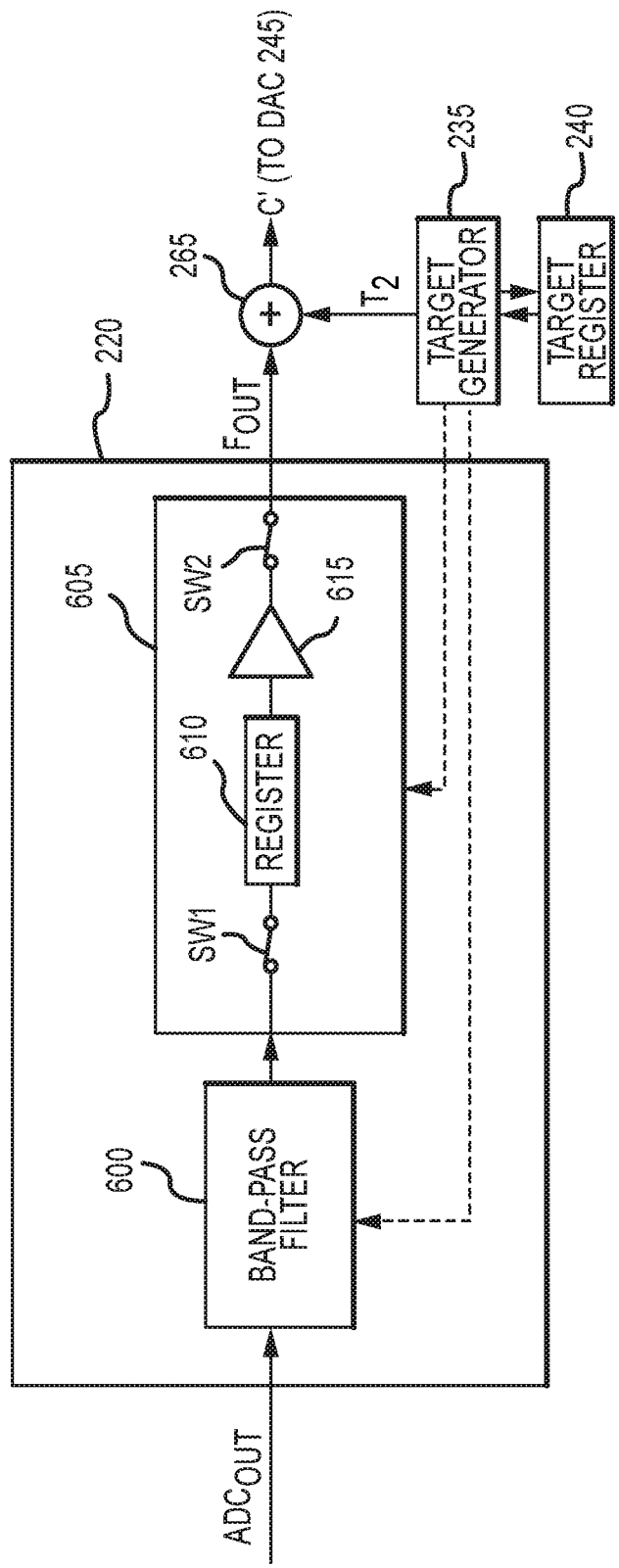
FIG. 6 is a block diagram of a feedback control circuit in accordance with an exemplary embodiment of the present technology.

Referring to FIG. 6, the feedback control circuit 220 may be configured to attenuate desired frequencies of a signal and selectively adjust a gain of the signal and/or generate a final feedback output signal $F_{OUT}$. According to an exemplary embodiment, the feedback control circuit 220 is connected between an output terminal of the ADC 215 and an input terminal of the adder circuit 265. Accordingly, the feedback control circuit 220 receives and performs various filtering and gain control on the ADC output signal $ADC_{OUT}$. The feedback control circuit 220 may also be responsive to the target generator 235. For example, the feedback control circuit 220 may receive, either directly or indirectly, operation and/or position information from or related to the target generator 235. The feedback control circuit 220 may control the gain of the signal and/or perform filtering operations according to the operation and/or position information.

According to various embodiments, the feedback control circuit 220 operates according to a particular control sequence. The control sequence may enable/disable the feedback control circuit 220 by controlling the operation of a filter, various switches, and/or a gain according to the target generator 235. For example, the control sequence may correspond to a state of operation (e.g., ON or OFF) and/or other relevant information of the target generator 235.

According to various embodiments, the feedback control circuit 220 may be directly connected to or communicatively connected to the target generator 235, and the feedback control circuit 220 may receive one more control signals from the target generator 235 indicating the state of operation and/or other relevant information.

The feedback control circuit 220 may comprise any suitable circuit and/or system to perform various signal filtering, such as a band-pass filter, a low-pass filter, a high-pass filter, feedback compensation filters, and the like. The particular filter may be selected according to a particular application and/or desired filtering capabilities. Further, the feedback control circuit 220 may comprise any circuit and/or system suitable for selectively applying a desired gain to a signal.

In an exemplary embodiment, and referring to FIG. 6, the feedback control circuit 220 may comprise a band-pass filter 600 to remove predetermined high and low frequencies and allows intermediate frequencies (those frequencies between the high and low frequencies) to pass through. The band-pass filter 600 may be connected to the ADC 215 and configured to receive the ADC output signal $ADC_{OUT}$. The band-pass filter 600 may comprise a conventional band-pass filter or any other filter suitable for attenuating particular frequencies. The band-pass filter 600 may further comprise a plurality of registers to temporarily store relevant data and/or operate as a time delay device for the stored data.

The feedback control circuit 220 may further comprise a gain control circuit 605 configured to selectively control and/or adjust a gain of an input signal. In an exemplary embodiment, the gain control circuit 605 may be connected to an output terminal of the band-pass filter 600. Accordingly, the gain control circuit 605 may receive and apply a gain to an output signal from the band-pass filter 600.

According to an exemplary embodiment, the gain control circuit 605 may comprise a first switch SW1 responsive to a first control signal, a register 610 configured to store data, an amplifier 615 configured to apply a variable gain to an input signal (e.g., input voltage), and a second switch SW2 responsive to a second control signal.

The first switch SW1 may be connected between the band-pass filter 600 and the register 610; the amplifier 615 may be connected between the register 610 and the second switch SW2; and the second switch SW2 may be connected between the amplifier 615 and the adder circuit 265. Accordingly, the final feedback output signal $F_{OUT}$ corresponds to an output voltage of the amplifier 615.

In various embodiments, the control circuit 120 utilizes the updated position signal $T_2$ from the target generator 235 and the final feedback output signal $F_{OUT}$ from the feedback control circuit 220 to generate the final position signal C'. For example, the control circuit may utilize the adder circuit 265 to add the updated position signal $T_2$ to the final feedback output signal $F_{OUT}$ to compute the final position signal C'. According to various embodiments, utilizing both the final feedback signal $F_{OUT}$ and the updated position signal $T_2$ provides smoother movements of the actuator 110 when moving from one position to another.

The control circuit 120 may further comprise a second signal converter, such as a digital-to-analog converter (DAC) 245, to convert the final position signal C' to an analog signal, such as the DAC output signal C, before transmitting the signal to the driver 250. For example, an input terminal of the DAC 245 may be connected to an output terminal of the adder circuit 265. The DAC output signal C may be a positive value or a negative value, and the sign of the DAC output signal C and the particular numerical value may correspond to the direction and magnitude, respectively, of the current $I_{DR}$ (or voltage). The DAC 245 may communicate the DAC output signal C to the driver 250, wherein the driver 250 responds to the DAC output signal C by, for example, operating according to the sign and/or magnitude of the DAC output signal C. For example, a positive value may cause the current $I_{DR}$ to flow from the first output terminal OUT1 to the second output terminal OUT2. Conversely, a negative value may cause the current $I_{DR}$ to flow from the second output terminal OUT2 to the first output terminal OUT1. The DAC 245 may further communicate the sign (positive or negative) of the DAC output signal C to the induced voltage detection circuit 205(A/B). In various embodiments, the DAC output signal C comprises a code (e.g., a DAC code). The DAC output signal C may correspond to a current, a voltage, or a pulse width modulation.

The control circuit 120 may further comprise a processing circuit (not shown) configured to control various components in the control circuit 120. The processing circuit may receive various signals and send various control signals to according to the control sequence. The processing circuit may be directly connected or communicatively connected to various components in the control circuit 120, such as the band-pass filter 600, the gain control circuit 605, the target generator 235, and the target register 235. For example, the processing circuit may transmit signals to control the first and second switches SW1, SW2, to the control the gain of the amplifier 615, and/or to control operation of the band-pass filter 600 according to operation and/or position information from the target generator 235. Accordingly, the processing circuit may facilitate operation of the feedback control circuit 220 based on the control sequence. The processing circuit may be implemented in hardware, software, or a combination. For example, the processing circuit may comprise various logic circuits adapted to receive data and generate an output according to the data in a predetermined manner. The processing circuit may further comprise a counter (not shown) to generate a counter value according to a clock signal (not shown).

During operation, the actuator 110 may experience vibrations due to user-induced external vibrations or vibrations due to changing the initial position, both of which may generate the induced voltage. According to various embodiments, the methods and apparatus for actuator control operate to reduce the settling time of the actuator 110 by detecting and/or measuring the induced voltage and adjusting the final position signal C' to compensate for or otherwise reduce the effects of the induced voltage. The methods and apparatus for actuator control may also operate to reduce the settling time of the actuator 110 by improving the integrity of a feedback signal by determining the induced voltage of the actuator 110 and controlling the current $I_{DR}$ transmitted to the actuator 110. According to various embodiments, controlling the current $I_{DR}$ in a particular manner allows the actuator 110 to smoothly transition from one position to different position. This allows the actuator 110 to reach a desired position within a short period of time. According to various embodiments, the current $I_{DR}$ is computed based on multiple variables, such as the final feedback control signal Barr and the updated position signal $T_2$.

Figure 8:
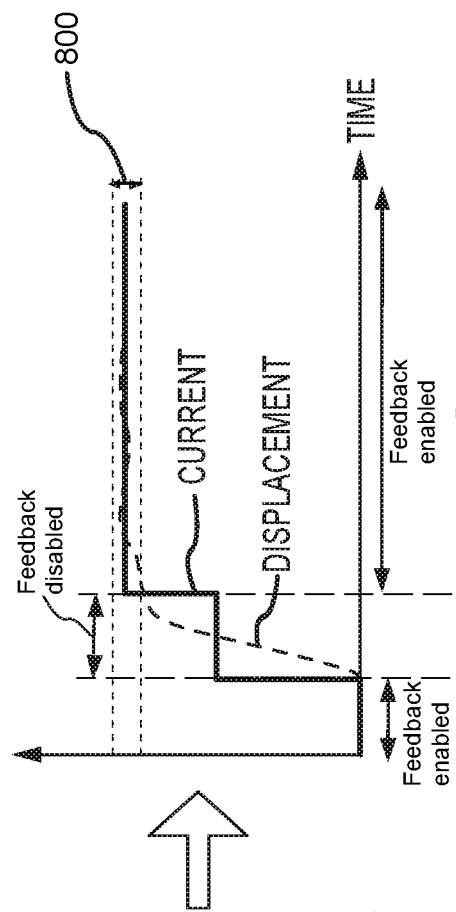
FIG. 8 is graph illustrating a current waveform and lens displacement waveform in accordance with an exemplary embodiment of the present technology.
Figure 7:
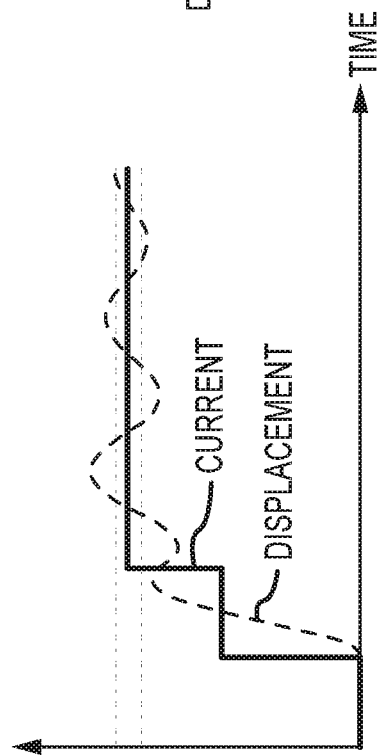
FIG. 7 is a graph illustrating a current waveform and lens displacement waveform of a conventional actuator control system.
Figure 9:
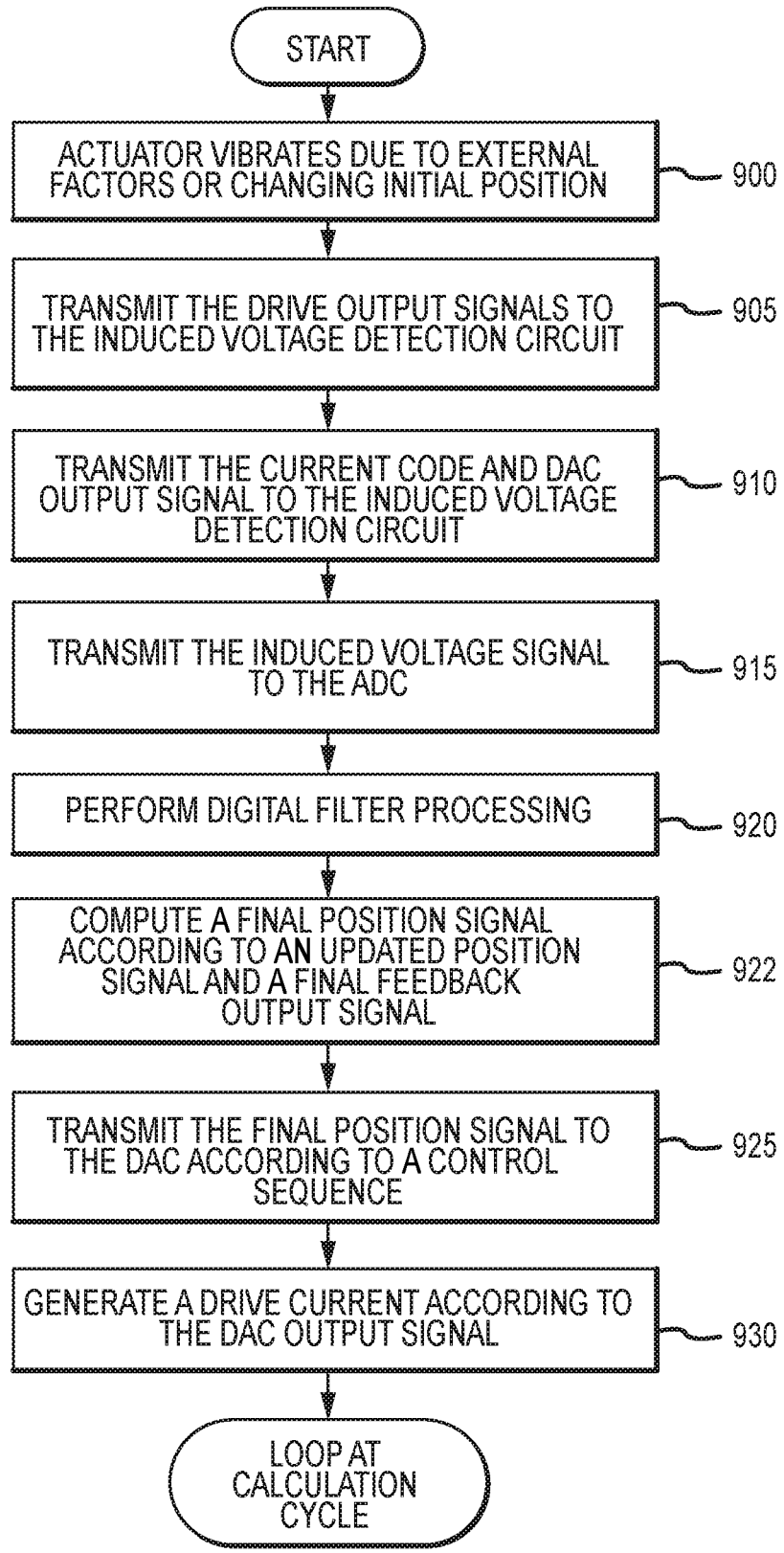
FIG. 9 is a flowchart for operating the actuator control system in accordance with one embodiment of the present technology.

The methods and apparatus may further operate to stop the current $I_{DR}$ going to the actuator 110, gradually decrease the current $I_{DR}$, and gradually increase the current $I_{DR}$ at appropriate times as determined according to the control sequence. As a result, the method and apparatus may produce a lens displacement output waveform (FIG. 8) that converges within a target range 800 in less time than an existing method and apparatus (FIG. 7).

The methods and apparatus may further implement various digital signal processing functions to filter various frequencies and selectively apply a variable gain to a feedback signal such that the final position signal C' varies according to the state of operation of the control circuit 120.

Referring to FIGS. 2, 6, and 8-11, in an exemplary operation, and in response to either external vibrations or a change in initial position signal $T_1$ (900), the driver output signals (e.g., signals A and B in the case of the bidirectional system or signal A in the case of the unidirectional system) are transmitted to the induced voltage detection circuit 205(A/B) via transmission lines connected between the output terminals of the driver 250 (i.e., OUT1 and OUT2) and the actuator 110 (905). The control circuit 120 (and/or processing circuit) also transmits the direction (e.g., forward or reverse direction) of the current $I_{DR}$ (generally in the form of a code) and the DAC output signal C to the induced voltage detection circuit 205(A/B) (910).

The induced voltage detection circuit 205(A/B) may then generate and transmit the induced voltage signal D to the ADC 215 (915). After the ADC 215 converts the signal and transmits the converted signal to the feedback control circuit 220, the feedback control circuit 220 may be operated according to the control sequence.

Operating the feedback control circuit 220 according to the control sequence may comprise performing filtering of the converted signal and applying a gain to the converted signal (920) at a particular time or event. Operating the feedback control circuit 220 according to the control sequence may further comprise enabling and disabling the feedback control circuit 220 at a particular time or event.

The control circuit 120 then generates and applies the current $I_{DR}$ to the actuator 110 according to the DAC output signal C. In a case where the feedback control circuit 220 is enabled, the feedback control circuit 220 transmits the final feedback output signal $F_{OUT}$ to the adder circuit 265 where the adder circuit 265 adds the final feedback output signal $F_{OUT}$ and the updated position signal $T_2$ to generate the final position signal C' (922). The control circuit 120 then transmits the final position signal C' to the DAC 245 (925). The control circuit 120 then generates the current $I_{DR}$ according to the DAC output signal C. In other words, the driver 250 generates and applies a current $I_{DR}$ to the actuator 110 according to the final feedback output signal $F_{OUT}$ and the updated position signal $T_2$.

In a case where the feedback control circuit 220 is disabled, the adder circuit 265 does not receive the final feedback output signal $F_{OUT}$ and the driver 250 may generate and apply a current $I_{DR}$ that corresponds only to the updated position signal $T_2$.

The control circuit 120 may enable/disable the feedback control circuit 220 according to the state of operation and/or the control sequence. For example, the control circuit 120 may determine if the target generator 235 is operating (i.e., ON and/or corresponding to counter value 0 to N) (1000). If the target generator 235 is operating, then the target generator 235 will continue to operate, generate a new updated position signal $T_2$ (1005), execute the control sequence (1010), and increment the value of the counter (the counter value) until the sequence is completed (1015).

If the target generator 235 is not operating, then the control circuit 120 may determine the counter value (1020). If the counter value is greater than zero, then the control circuit 120 may execute the control sequence corresponding to the counter value at that particular time (1010) and increment the counter value until the sequence is completed (1015).

If counter value is not greater than zero (i.e., the counter value is equal to zero), then the control circuit 120 may determine if the target register 240 has been updated with a new initial position value $T_1$ (1025). If the target register 240 has not been updated, then the control circuit 120 returns to the start. If the target register 240 has been updated, then the control circuit 120 sets a new current IDR according to the new register value (e.g., the new initial position value $T_1$). The control circuit 120 then executes the control sequence (1010) starting at the sequence corresponding to a counter value of zero, and increments the counter value until the sequence is completed (1015).

Figure 10:
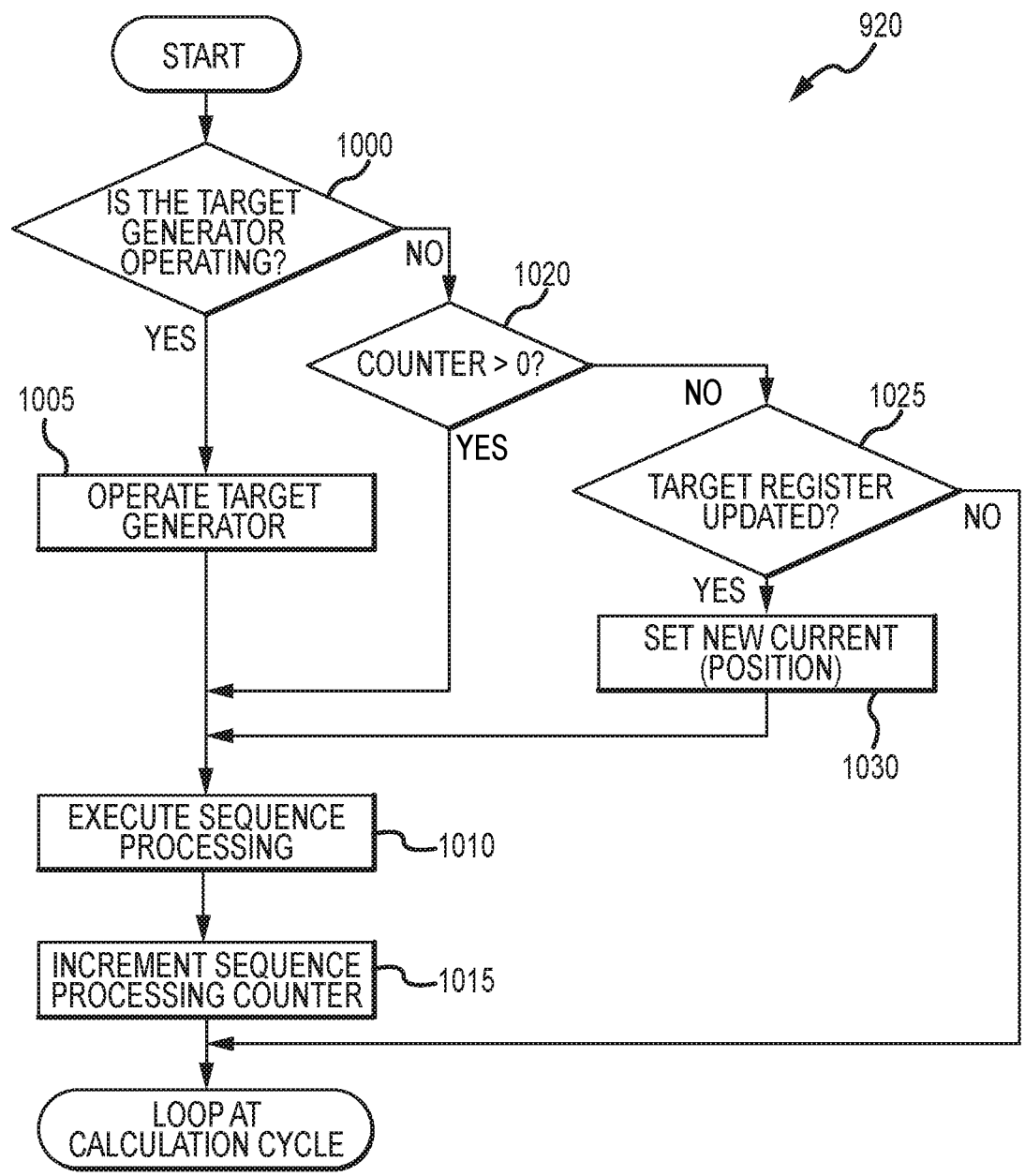
FIG. 10 a flowchart for operating the feedback control circuit in accordance with an exemplary embodiment of the present technology.

Referring to FIG. 10, the control circuit 120 may utilize the control sequence to facilitate control (i.e., enable or disable) of the feedback control circuit 220, for example the band-pass filter 600 and the gain control circuit 615. For example, the amplifier 615 may apply a particular gain to an input signal based on the counter value, the state of operation of the target generator 235, and/or the state of the target register 240, and control the first and second switches SW1, SW2 according to the counter value.

The control sequence may comprise a final counter value M, for example the final counter value may range from 5 to 10. In addition, when the counter reaches a predetermined value N, the gain is set to zero (cutoff) and both the first and second switches SW1, SW2 are turned OFF (open). The predetermined value N may be any number between 0 and M, for example between 1 and 9, and be selected according to a desired final feedback output signal Four and/or desired current IDR.

In an exemplary embodiment, the control sequences corresponding to counter values 0 to N−1 may be referred to as enabling sequences and the feedback control circuit 220 is enabled during those sequences. During the present counter values, the control circuit 120 decreases the gain of the amplifier 615 incrementally from approximately one-half to one-eighth. The number of incremental decreases will be based on the total number of counts from 1 to N−1, and the total number of counts from 1 to N−1 may be referred to as a first count period. For example, the number of incremental decreases may be in a range of 2 to 5. The control circuit 120 may operate the band-pass filter 600 in either a normal operation, for example during counter value 0, or clearing data and inputting new data in the delay registers (not shown). During the present counter values, the first switch SW1 is OFF (open) and the second switch SW2 is ON (closed).

The control sequence corresponding to the counter value N may be referred to as a disabling sequence and the feedback control circuit 220 is disabled during that sequence. During the present counter value, the control circuit 120 cutoffs the gain of the amplifier 615 and turns off the first and second switches SW1, SW2.

Similarly, the control sequences corresponding to the counter values N+1 to M are also referred to as enabling sequences and the feedback control circuit 220 is enabled during those sequences. During the present counter values, the control circuit 120 increases the gain of the amplifier 615 incrementally from approximately one-eighth to one-half. The number of incremental increases will be based on the total number of counts from N+1 to M, and the total number of counts from N+1 to M may be referred to as a second count period. For example, the number of incremental decreases may be in a range of 2 to 5. The control circuit 120 may operate the band-pass filter 600 in the normal operation. During the present counter values, both the first and second switches SW1, SW2 are ON (closed).

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. An actuator control circuit, comprising:
   a drive circuit, coupled to the actuator and configured to supply a drive signal to the actuator; and
   a feedback network connected to the drive circuit and configured to generate a feedback signal, wherein the feedback network comprises:
      an induced voltage detection circuit connected to an output terminal of the drive circuit; and
      a feedback control circuit configured to:
         attenuate a portion of the feedback signal that falls outside of a predetermined frequency range; and
         adjust a gain of the feedback signal.

2. The actuator control circuit according to claim 1, wherein the feedback control circuit comprises:
   a band-pass filter; and
   a gain control circuit connected to an output terminal of the band-pass filter.

3. The actuator control circuit according to claim 2, wherein the gain control circuit comprises:
   an amplifier;
   a first switch connected between the band-pass filter and an input terminal of the amplifier; and
   a second switch connected to an output terminal of the amplifier.

4. The actuator control circuit according to claim 3, wherein:
   the amplifier is configured to adjust the gain of the feedback signal according to a counter value; and
   the first and second switches are operated according to the counter value.

5. The actuator control circuit according to claim 1, wherein the feedback control circuit is further configured to:
   decrease the gain of the feedback signal for a first count period; and
   increase the gain of the feedback signal for a second count period.

6. The actuator control circuit according to claim 5, wherein the control circuit is further configured to disable the feedback control circuit for a period of time between the first count period and the second count period.

7. The actuator control circuit according to claim 1, wherein the feedback network further comprises an analog-to-digital converter (ADC) connected between the induced voltage detection circuit and the feedback control circuit and configured to convert the feedback signal to a digital signal.

8. The actuator control circuit according to claim 1, further comprising a digital-to-analog converter (DAC) connected to an input terminal of the drive circuit and an input terminal of the induced voltage detection circuit.

9. The actuator control circuit according to claim 8, wherein the induced voltage detection circuit comprises:
   a replica circuit connected to an output terminal of the DAC; and
   a differential amplifier connected to an output terminal of the replica circuit.

10. The actuator control circuit according to claim 1, wherein the induced voltage detection circuit is further configured to receive information relating to a direction of current though the drive circuit.

11. A method for controlling an actuator, comprising:
supplying a drive signal to the actuator;
detecting an induced voltage generated by the actuator;
generating a feedback signal according to the detected induced voltage;
attenuating a portion of the feedback signal;
adjusting a gain of the feedback signal; and
operating the actuator according to the feedback signal.

12. The method for controlling an actuator according to claim 11, further comprising: receiving a position signal; and
operating the actuator according to the position signal and the feedback signal.

13. The method for controlling an actuator according to claim 11, wherein adjusting the gain comprises:
decreasing the gain during a first count period; and
increasing the gain during a second count period.

14. The method for controlling an actuator according to claim 13, further comprising disabling the feedback signal for a period of time between the first count period and the second count period.

15. An imaging system capable of performing autofocus with an actuator, comprising:
an image signal processor (ISP) configured to generate an initial position signal; and
a camera module connected to the image signal processor, comprising:
an image sensor coupled to the image signal processor, wherein the image sensor transmits image data to the image signal processor; and
a control circuit connected to the ISP and configured to receive the initial position signal from the image signal processor, wherein the control circuit comprises:
a drive circuit connected to the actuator;
a feedback network connected to the drive circuit and configured to generate a feedback signal, wherein the feedback network comprises:
an induced voltage detection circuit connected to an output terminal of the drive circuit; and
a feedback control circuit connected to the induced voltage detection circuit and configured to:
attenuate a portion of the feedback signal that falls outside of a predetermined frequency range; and
adjust a gain of the feedback signal; and
a target generator circuit connected to the ISP and configured to generate an updated position signal according to the initial position signal;
wherein the control circuit supplies a current, based on the feedback signal and the updated position signal, to the actuator.

16. The imaging system according to claim 15, wherein the feedback control circuit comprises:
a band-pass filter; and
a gain control circuit connected to an output terminal of the band-pass filter.

17. The imaging system according to claim 16, wherein the gain control circuit comprises:
an amplifier;
a first switch connected between the band-pass filter and an input terminal of the amplifier; and
a second switch connected to an output terminal of the amplifier.

18. The imaging system according to claim 17, wherein:
the amplifier is configured to adjust the gain of the feedback signal according to a counter value; and
wherein the first and second switches are operated according to the counter value.

19. The imaging system according to claim 15, wherein the feedback control circuit is further configured to:
decrease the gain of the feedback signal for a first count period; and
increase the gain of the feedback signal for a second count period.

20. The imaging system according to claim 19, wherein the control circuit is further configured to disable the feedback control circuit for a period of time between the first count period and the second count period.

* * * * *